(12) United States Patent
Van Arendonk et al.

(10) Patent No.: US 9,581,702 B2
(45) Date of Patent: Feb. 28, 2017

(54) MOISTURE SEAL FOR RADIOLOGICAL IMAGE SENSOR

(71) Applicant: TELEDYNE Dalsa, Inc., Thousand Oaks, CA (US)

(72) Inventors: Anton Van Arendonk, Waterloo (CA); James J. Miller, Tavistock (CA)

(73) Assignee: Teledyne Dalsa, Inc., Waterloo, Ontario (CA)

( * ) Notice: Subject to any disclaimer, the term of this patent is extended or adjusted under 35 U.S.C. 154(b) by 0 days.

(21) Appl. No.: 14/434,297

(22) PCT Filed: Oct. 2, 2013

(86) PCT No.: PCT/CA2013/000838
§ 371 (c)(1),
(2) Date: Apr. 8, 2015

(87) PCT Pub. No.: WO2015/048873
PCT Pub. Date: Apr. 9, 2015

(65) Prior Publication Data
US 2016/0209516 A1    Jul. 21, 2016

(51) Int. Cl.
*G01T 1/20*    (2006.01)

(52) U.S. Cl.
CPC .......... *G01T 1/2018* (2013.01); *G01T 1/2002* (2013.01)

(58) Field of Classification Search
CPC .............. G01T 1/29; G01T 1/161; A61B 6/12
See application file for complete search history.

(56) References Cited

U.S. PATENT DOCUMENTS

| 5,434,418 A | 7/1995 | Schick |
| 7,772,558 B1 * | 8/2010 | Nagarkar .................. G01T 1/20 250/361 R |
| 2003/0127600 A1 * | 7/2003 | Vafi ........................ G01T 1/2018 250/370.11 |
| 2003/0173493 A1 | 9/2003 | Homme et al. |
| 2008/0217550 A1 | 9/2008 | Shoji et al. |

FOREIGN PATENT DOCUMENTS

EP    1300694    4/2003

* cited by examiner

*Primary Examiner* — David Porta
*Assistant Examiner* — Faye Boosalis
(74) *Attorney, Agent, or Firm* — Eric A. Gifford

(57) ABSTRACT

A radiation imaging device having a moisture impermeable metal layer compressed against a scintillator layer by compressible layer that is mechanically compressed against the scintillator layer. The metal layer is attached to the scintillator substrate by an adhesive ring surrounding the perimeter of the scintillator substrate. The adhesive can further include moisture getter particles. Preferably the metal layer is comprised of aluminum with a thickness between 25 μm and 100 μm to allow the layer to be flexible as free of pinholes to prevent ingress of moisture. The compressible layer can be compressed by the housing to maintain the metal layer in contact with the scintillator layer. The metal layer not only provides moisture protection for the scintillator but also increases the output of the scintillator by reflecting photons generated by the scintillator layer toward the photodetector array of the radiation imaging device.

20 Claims, 4 Drawing Sheets

MOISTURE SEAL FOR RADIOLOGICAL IMAGE SENSOR

FIELD

The present disclosure relates generally to processes and materials for assembly of radiological image sensors, such as those used for medical and industrial imaging applications.

BACKGROUND

Radiological image sensors are commonly used in medical diagnostic imaging and material analysis industries. Radiological image sensors can use a scintillator material to convert incoming ionizing radiation (e.g. X-rays, gamma rays, or other charged particle radiation) into visible light that can be detected by a semiconductor chip having an array of photodetectors. Signal processing electronics coupled to the semiconductor chip can provide an image or other suitable signal depending on the application.

Performance of the radiological image sensor is highly dependent on the operation of the scintillator material. The scintillator material is typically composed of an ionic salt, typically a rare earth ionic salt and most commonly cesium iodide (CsI). These ionic salts of the scintillator material are crystalline, with needle-shaped crystals, that are oriented perpendicular to the plane of the substrate and photodetector array. The crystals act as short optical fibers to ensure that light photons originating in a crystal exit the crystal at its end and into an adjacent photodetector, rather than propagating laterally within the scintillator material. These scintillator materials are hygroscopic and any moisture absorbed by the scintillator material will adversely affect this crystal structure and degrade the image quality of the radiological image detector. Limiting moisture exposure to the scintillator material can improve performance and longevity of the radiological image sensor. The solid state electronics of the photodector array can also be corroded and degraded from moisture.

It is difficult to manufacture a hermetic packaging for radiological imaging devices with low water vapor content and to maintain it during its many years of operation. There are mechanisms for water vapor to enter the package interior that include seal leakages, water generated during the sealing process and moisture outgassing from adhesives, substrate materials or even the package itself. Encasing scintillators within hermetically sealed enclosures has proven especially difficult due to the irregularly shaped perimeter edge and the irregularity of the top surface due to the formation of the scintillator using a deposition process.

One approach to sealing the scintillator material is using poly(p-xylylene) polymers that are commonly referred to by the trade name Parylene. These films are radiolucent and are relatively low in permeability to water vapor and gases. U.S. Patent Application No. 2003/0173493 to Homme et al. discloses covering the scintillator with a protective film made from poly-para-xylylene resin or poly-para-chloroxylylene (trade names Parylene and Parylene C, respectively). Parylene coatings for the scintillator material are expensive and due to the deposition process can potentially create air gaps between the Parylene and the scintillator. Air gaps can interfere with the transmission of emitted photons to the photodetector array and can possibly trap moisture. Using a thick layer of Parylene can also cause dispersion that affects the image quality. It is difficult and expensive to create a Parylene coating that is free from pin holes that could allow moisture to access the scintillator.

Another approach disclosed by U.S. Pat. No. 5,132,539 to Kwasnick et al. discloses bonding a cover to an enclosure ring surrounding the scintillator to seal the scintillator. Kwasnick teaches using a cover that is radiation transmissive and optically reflective, such as aluminum, to reduce scattering and escape of light from the scintillator. The cover is held in contact with the scintillator layer by either depositing the scintillator material directly onto the cover or evacuating the chamber formed by the cover in order to draw the cover inwards towards the surface of the scintillator. Kwasnick further discloses using a desiccant disposed within the chamber around the scintillator to provide further moisture protection for the scintillator. The approach disclosed by Kwasnick is prone to failure due to difficulty in maintaining the vacuum that holds the cover in contact with the scintillator Other approaches to sealing the scintillator material use a rigid cap structure. These approaches add significant weight from the cap structure and can attenuate incoming radiation. These rigid cap structures are also prone to thermal mismatch issues between the materials of the cap structure and the substrate and other materials of the radiological imaging device.

SUMMARY

Accordingly, there is a need for a radiological imaging device that addresses at least some of the issues of current radiological imaging devices.

According to a first aspect, a radiological imaging device is provided comprising a photodetector array disposed on an imager substrate, a scintillator layer deposited on a scintillator substrate, the scintillator layer having a top surface and a bottom surface, the bottom surface optically coupled to the photodetector array to provide emitted photons to the photodetector array when the top surface is exposed to incident radiation, a metal layer adjacent to the top surface of the scintillator layer, the metal layer covering the scintillator layer to seal the scintillator layer between the metal layer and the scintillator substrate, and a compressible layer that mechanically compresses the metal layer against the scintillator layer.

In some aspects, the radiological imaging device can further include an adhesive surrounding a perimeter of the scintillator substrate to attach the metal layer to the scintillator substrate. The adhesive can attach to a bottom surface of the metal layer and a top surface of the scintillator substrate, or the adhesive can attach to an outside edge of a top surface of the metal layer. In related aspects, the adhesive can further include moisture getter particles.

In some aspects it is preferred that the metal layer is flexible to conform to the top surface of the scintillator, and that the metal layer has a thickness selected to provide a moisture barrier. In some aspects the metal layer can be aluminum, preferably with a thickness between 25 μm and 100 μm. The metal layer can have an optically reflective bottom surface that reflects photons generated by the scintillator layer toward the photodetector array.

In some aspect, the compressible layer can be comprised of any one of a foam, a gel, an air bag, and a soft silicone rubber. The scintillator substrate can be any one of the photodetector array and a fiber optic plate. In some aspects, the device can further include a housing that compresses the compressible layer against the metal layer to maintain contact of the metal layer with the scintillator layer.

BRIEF DESCRIPTION OF THE DRAWINGS

For a better understanding of the various embodiments described herein and to show more clearly how they may be carried into effect, reference will now be made, by way of example only, to the accompanying drawings which show at least one exemplary embodiment, and in which.

DESCRIPTION OF VARIOUS EMBODIMENTS

It will be appreciated that for simplicity and clarity of illustration, where considered appropriate, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementations of various embodiments described herein.

Figure 1:
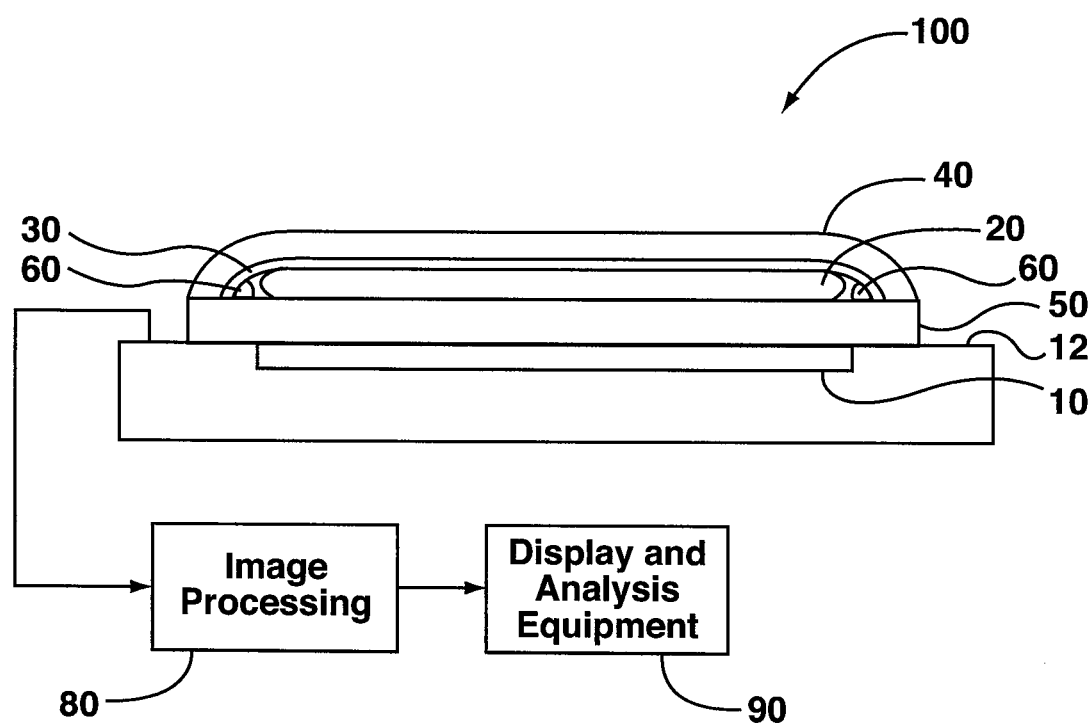
FIG. 1 is a schematic cross sectional diagram of a radiological imaging device.

Reference is first made to FIG. 1, shown is a schematic cross sectional diagram of a radiological imaging device 100 that comprises a photodetector array 10 disposed on an imager substrate 12, a scintillator layer 20 that is coupled to photodetector array 10, a metal layer 30 covering scintillator layer 20, and a compressible layer 40 that mechanically compresses metal layer 30 against scintillator layer 20. Photodetector array 10 is coupled to an image processing circuit 80, which processes the electrical signals from photodetector array 10 for use in display and analysis equipment 90.

Photodetector array 10 includes a number of photodetectors that are arranged and electrically connected in a row and column array. Photodetector array 10 is preferably implemented using known solid state photodetectors, and can be implemented as one or more silicon substrates that include the array of photodetectors. Photodetector array 10 can use any one of a number of imaging technologies, including, but not limited to, charge coupled device (CCD), single-photon avalanche diode (SPAD), complementary metal oxide semiconductor (CMOS) sensor elements, amorphous silicon detectors, and organic material-based light sensors. Photodetector array 10 can be comprised of a mono-crystalline silicon or any other suitable material, including, for example, flat panel detectors made on glass substrates and plastic electronics.

Radiation incident on scintillator layer 20 excites photons that are detected by photodetector array 10. Each photodetector of photodetector array 10 can measure the amount of light generated by incident radiation on scintillator layer 20 as an electrical signal that varies according to the intensity of the incident radiation. In a medical radiological imaging sensor, the electrical signal of each photodetector can produce an image that is representative of the attenuation of a radiation beam, such as an X-ray.

Scintillator layer 20 is disposed on a scintillator substrate. The term scintillator substrate is used herein to refer to the portion of radiological imaging device 100 that is in contact with scintillator layer 20 and may further provide optical coupling between scintillator layer 20 to photodetector array 10. Scintillator layer 20 can be grown or deposited directly onto radiological imaging device 100, or in other embodiments, scintillator layer 20 can be applied as a strip, such as on a polyimide strip, for example, that can be secured onto radiological imaging device 100. Scintillator layer 20 is optically coupled to photodetector array 10 to allow photons generated by scintillator layer 20 readily pass into photodetector array 10. In the embodiment shown in FIG. 1, scintillator substrate is provided by fiber optic plate 50 that can be used to guide photons to the underlying photodetectors of photodetector array 10 and can also provide refractive index matching. Fiber optic plate 50 comprises a plurality of parallel optical wave guides that direct light energy from the scintillator layer 20 to the top surface of photodetector array 10. In other embodiments, the scintillator layer 20 and the fiber optic plate 50 can be integrated into a single integral component.

Figure 2:
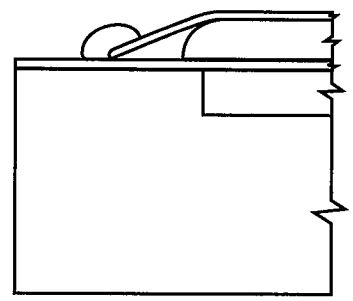
FIG. 2 is sectional view of cross section of a radiological imaging device illustrating an alternative adhesive arrangement.

In the embodiment shown in FIG. 2, scintillator layer 20 is disposed on photodetector array 10 (or preferably onto a protective layer covering photodetector array 10). Scintillator layer 20 is composed of an ionic salt, typically cesium iodide (CsI), but other known scintillating materials can be used. Cesium iodide and other known scintillating materials are highly hygroscopic and will dissolve while absorbing water vapor from the environment. Moisture will destroy the crystal structure of scintillator layer 20 and degrade the performance of radiological imaging device 100.

Metal layer 30 is placed on top of scintillator layer 20 and extends over scintillator layer 20 so that the outer edges of metal layer 30 can be bonded to the scintillator substrate by adhesive ring 60 to provide a moisture seal. A chamber is formed between the lower surface of metal layer 30, the top surface of the scintillator substrate (FOP 50 in FIG. 1), and adhesive ring 60.

In some embodiments, metal layer 30 is placed directly on top of scintillator layer 20. In other embodiments, scintillator layer 20 can have a thin coating on its top surface that can help smooth the top surface of scintillator layer 20 to allow metal layer 30 to more easily conform to its surface. Preferably, the coating on scintillator layer 20 is thin to limit dispersion of light reflected from metal layer 30. The coating can be comprised of poly(p-xylylene) polymers, such as Parylene or its variants, as noted above.

Metal layer 30 is compressed against scintillator layer 20 by compressible layer 40. A housing (for example, that shown in FIGS. 4 and 5) can apply mechanical force downwards (i.e. towards scintillator layer 20) on compressible layer 40 to press metal layer 30 against scintillator layer. Metal layer 30 is resting on the top surface of scintillator layer 20, effectively floating on scintillator layer 20 such that metal layer 30 is not secured or attached directly to scintillator layer but is held in position by compressible layer 40. No chemical or mechanical bonding is used between the adjacent surfaces of metal layer 30 and scintillator 20. Adhesive ring 60 attaches metal layer 30 to radiological imaging device 100 on the portion of metal layer 30 that overlaps scintillator layer 20.

The thickness of metal layer 30 is selected to be impermeable to moisture yet flexible. Flexibility of metal layer 30 allows it to conform to the top surface of scintillator layer 20 and the edges of the scintillator substrate from the compression force applied by compressible layer 40.

Flexibility of metal layer 30 further allows metal layer to adjust for thermal expansion and contraction of components of radiological imaging device 100. Thermal coefficient of expansion mismatches could produce a high level of stress on the adhesive attaching metal layer 30 if metal layer 30 did not provide flexibility. Flexibility of metal layer 30 decreases sensitivity to mismatches in thermal expansion coefficients between metal layer 30 and scintillator substrate 20. This flexibility can prevent premature failure or non-optimal performance of the adhesive caused by stress from thermal coefficient expansion mismatches. The volume of the cavity defined between metal layer 30 and scintillator layer 50 can be allowed to expand and contract due to the flexibility of metal layer 30 to accommodate fluctuations in temperature or pressure.

Metal layer 30 is comprised of a radiolucent metal to allow incident radiation to pass through to scintillator layer 20. Aluminum can be used as metal layer 30 as it is substantially radiolucent at thicknesses that provide moisture impermeability for x-ray energies relevant for medical imaging. It was found that using an aluminum foil thickness less than 25 µm allowed pin holes and was not ideal for moisture permeability as it can become slightly permeable due to minute pinholes caused by the production process. Thickness of the aluminum foil over 100 µm limited flexibility of metal layer 30 preventing ideal conformance to scintillator layer 20.

Preferably, the bottom surface of metal layer 30 is optically reflective in order to reflect light generated by scintillator layer 20 back into scintillator layer 20 towards photodetector array 10. This improves the light output of radiological imaging device 100. By applying a uniform pressure from compressible layer 40 over the top surface of metal layer 30 provides a reflective optical surface on top of scintillator layer 20. Instead of light escaping from the top surface of scintillator layer 20 it is reflected back through scintillator layer 20 towards photodetector array 10, thus increasing the overall light output achieved from scintillator layer 20

Figure 3:
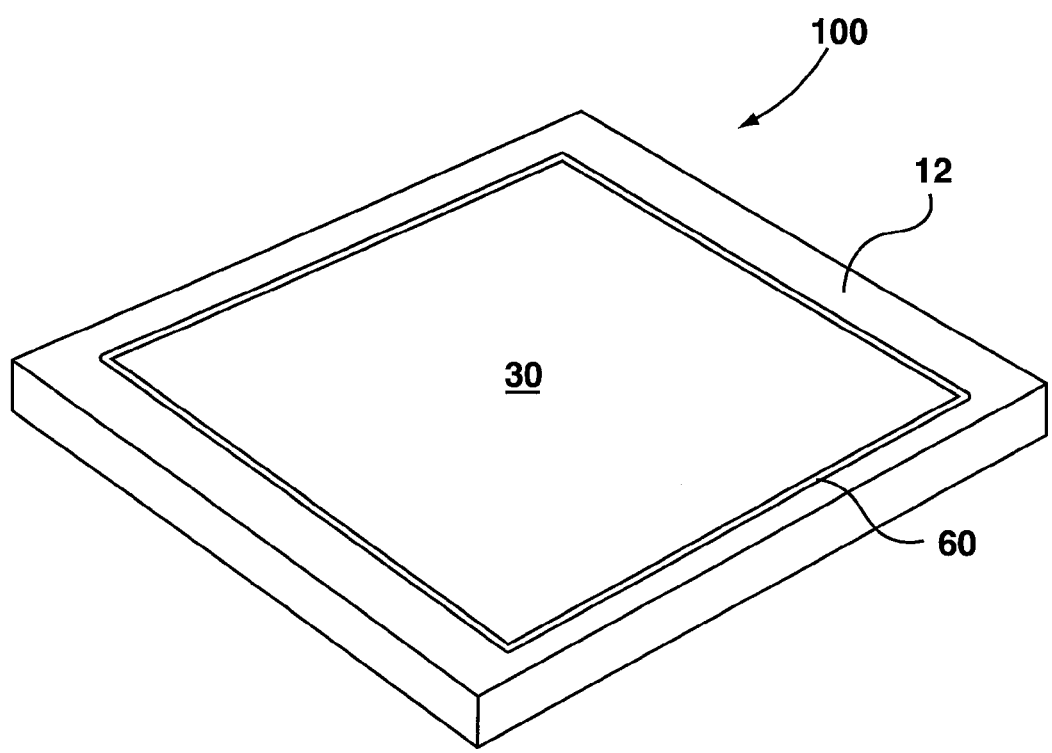
FIG. 3 is a perspective view of a radiological imaging device illustrating the ring of adhesive around the perimeter of the metal layer.

Referring now to FIG. 3, adhesive ring 60 is shown surrounding a perimeter of the scintillator substrate to attach metal layer 30 to the scintillator substrate. FIGS. 2 and 3 illustrate an embodiment where adhesive 60 attaches to an outside edge of a top surface of the metal layer and a top surface of the scintillator substrate. Adhesive ring 60 is applied to join the outer edge of metal layer 30 with the scintillator substrate. An alternate embodiment is illustrated in FIG. 1 illustrating adhesive 60 attaching to a bottom surface of metal layer 30 and a top surface of the scintillator substrate (FOP 50 in FIG. 1).

Adhesive ring 60 serves to provide a seal between metal layer 30 and the scintillator substrate to prevent moisture from entering the chamber defined by the adhesive ring 60, metal layer 30 and the scintillator substrate (e.g. FOP 50 in FIG. 1 or imager substrate 12 in FIG. 2). Adhesive ring 60 is placed around the entire perimeter of the metal layer 30 and provides a barrier at the edge of metal layer 30. Adhesive ring 60 can be formed from an epoxy-based adhesive. Preferably, adhesive ring 60 is curable by ultraviolet light or a low temperature as opposed to high temperature curable adhesives.

In some embodiments, the adhesive used in adhesive ring 60 can comprise moisture getter particles that trap moisture to prevent it from affecting scintillator layer 20. The moisture getter particles can be mixed with an epoxy-based adhesive prior to curing the epoxy to attach metal layer 20 to the scintillator substrate. Moisture getters contain potent desiccants dispersed within a permeable matrix that is typically a polymer. Desiccants can be common inorganic compounds that form hydrates by combining with one or more molecules of water. Zeolites, and other mineral-type compounds can also be used as a moisture getter. The chemical attraction for water molecules can limit moisture exposure of scintillator layer 20 within the chamber defined by metal layer 30, adhesive ring 60 and the scintillator substrate. Moisture getter particles can absorb water generated during the sealing process and moisture out-gassing from adhesive ring 60, substrate materials or even the package itself.

Compressible layer 40 applies downward pressure uniformly over metal layer 30. This forces metal layer 30 against scintillator layer 20 removing any space between metal layer 30 and scintillator layer 20. Pressure from compressible layer 40 causes metal layer 30 to form an optically reflective surface directly against the top surface of scintillator 20.

Compressible layer 40 can conform to the top surface of scintillator layer 20 to accommodate the uneven top surface from the crystal structure. Compressible layer 40 is resilient and transfers the compressive force applied by the housing to maintain pressure against metal layer 30. Use of a housing and a compressible layer 40 allows for easier disassembly and rework of radiological imaging device 100. Compressible layer 40 is preferably composed of a high density foam. In other embodiments compressible layer 40 can be composed of any one or combination of compressible/resilient materials, including, but not limited to, a gel, an air bag, or a synthetic rubber. In some embodiments, a soft silicone rubber can be used that allows compressible layer 40 to be very thin and requiring very little compressive force to maintain metal layer 30 in position. This also allows for use of a thinner housing to account for the thinner compressive layer 40.

Figure 4:
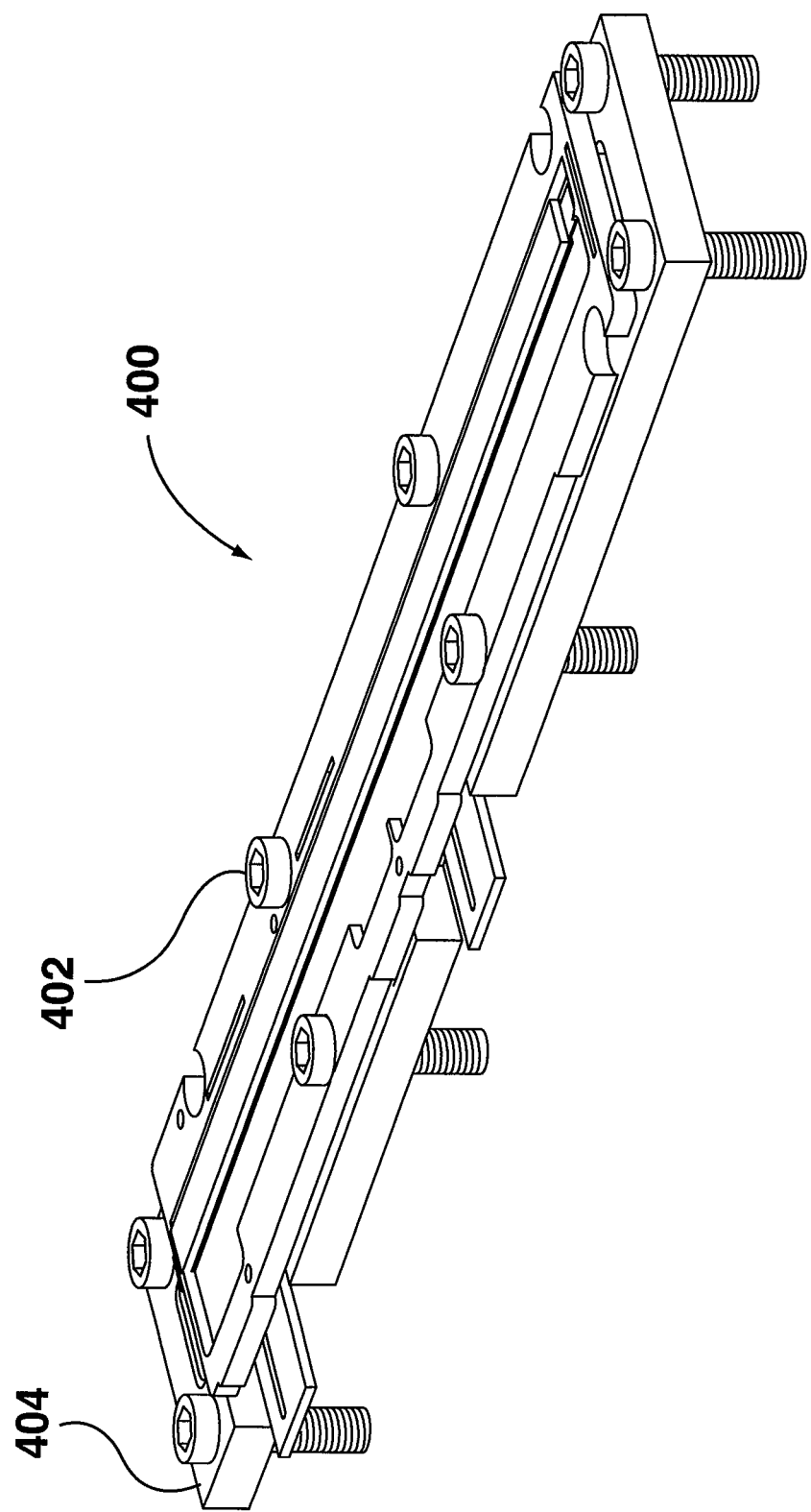
FIG. 4 is a perspective view of a housing of radiological imaging device.
Figure 5:
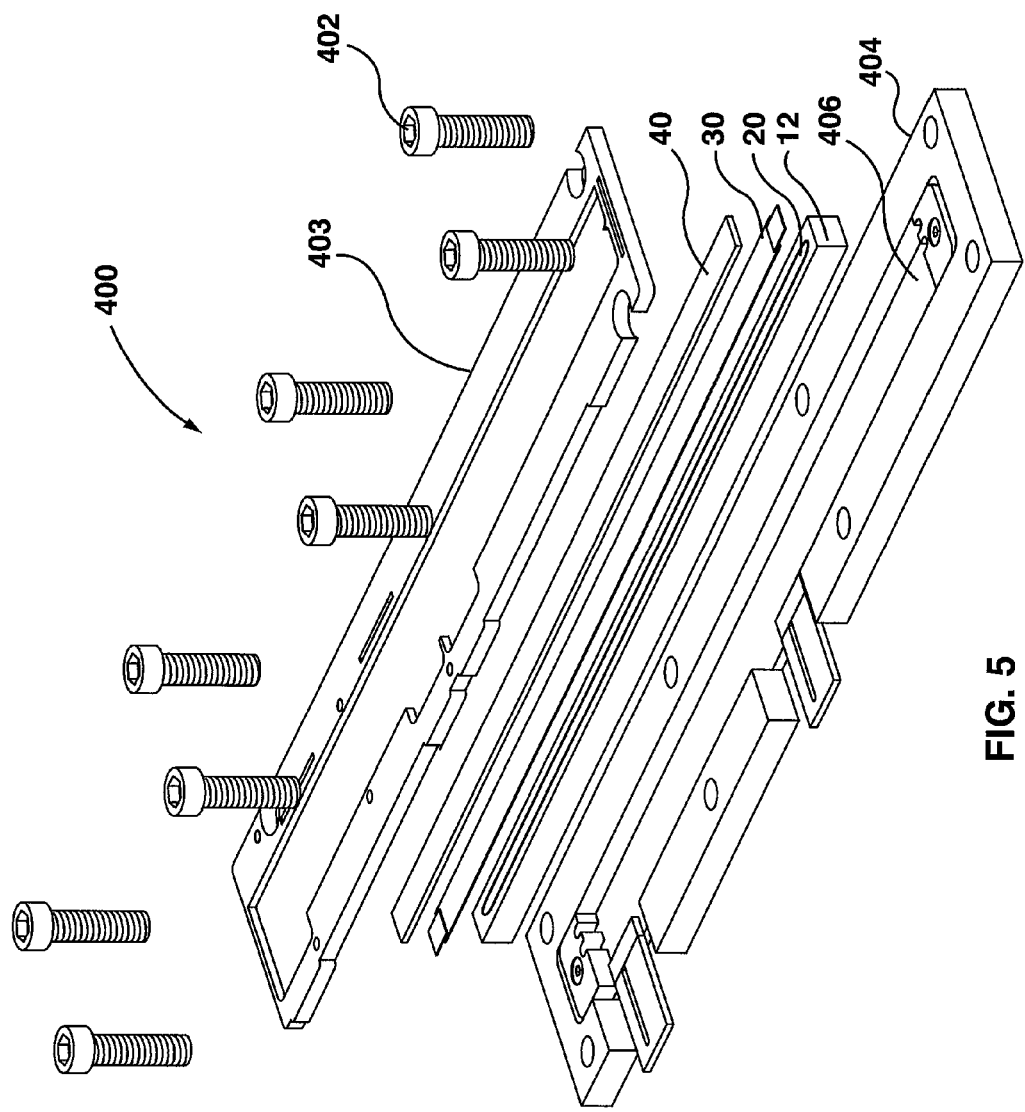
FIG. 5 is an exploded view of the housing of FIG. 4 illustrating the assembly of components of the radiological imaging device.

Referring now to FIGS. 4 and 5, an embodiment of a housing 400 is illustrated for containing the components of radiological imaging device 100 in a secure arrangement. Housing 400 can provide a mechanical clamping force that forces compressible layer 40 against metal layer 30 to maintain close contact with the top surface of scintillator layer 20. The housing can include a top plate 403 that is fastened to a bottom plate 404 by fasteners 402 to secure the components between the top plate 403 and bottom plate 404. Sufficient torque should be applied to fasteners 402 to secure top plate 403 to bottom plate 404 and compress compressible layer 40 without damaging radiological imaging device 100.

FIG. 4 illustrates housing 400 in a closed position and FIG. 5 provides an exploded view of the components of radiological imaging device 100 including housing 400. As shown in FIG. 5, bottom plate 404 can include a depression 406 for receiving the components of radiological imaging device 100 (e.g. those illustrated in FIGS. 1 and 2). Depression 406 can be further configured to receive imager substrate 12 and compressible layer 40. Compressible layer 40 is compressed to create an opposing force to the compression force of housing 400 to assist securing the layers, particularly metal layer 30 against scintillator layer 20. Top plate 403 and bottom plate 404 form a protective box thereby securing imager substrate 12 (including photodetector array 10 and scintillator layer 20), metal layer 30, and compressible layer 40.

In other embodiments, housing 400 used to secure the components of radiological imaging device 100 can be any mechanical securement device which mechanically holds or secures objects tightly together to prevent movement or separation through the application of compressive force (e.g. through use of clamps and/or removably securable fasteners and screws). The compressive force can be referred to as a mechanical z-force with respect to the x-y surface of substrate 12 and photodetector array 10. Housing 400 is preferably configured to allow removal and access to components of radiological imaging device 100, such as for rework or replacement of any of the components.

In the embodiment shown in FIG. 5, the imager substrate 12, including scintillator layer 20, metal layer 30, and compressible layer 40 are secured together by mechanical force applied by fasteners 402 between top plate 403 and bottom plate 404.

In other embodiments, housing 400 can comprise a plurality of clamps and/or fasteners positioned around the periphery of the outer layers of the imaging sensor device 100 for applying force to compressible layer 40. In one example, a top plate 403 can be secured to imager substrate 12 using plurality of clamps positioned around the periphery top plate 403 and imager substrate 12.

In some embodiments, a plurality of mechanical fasteners can be used to mechanically apply compressive force to compressible layer 40. In one embodiment, the mechanical fasteners 402 may comprise a continuous application of fasteners 402 around the perimeter of top plate 403, or a discontinuous application at discrete locations around the perimeter of top plate 403, or any combination thereof. In other embodiments, a carbon cover can be used that is attached to a metal frame by screws around its perimeter.

While the exemplary embodiments have been described herein, it is to be understood that the invention is not limited to the disclosed embodiments. The invention is intended to cover various modifications and equivalent arrangements included within the spirit and scope of the appended claims, and scope of the claims is to be accorded an interpretation that encompasses all such modifications and equivalent structures and functions.

The invention claimed is:

1. A radiation imaging device comprising:
a photodetector array disposed on an imager substrate;
a scintillator layer deposited on a scintillator substrate, the scintillator layer having a top surface and a bottom surface, the bottom surface optically coupled to the photodetector array to provide emitted photons to the photodetector array when the top surface is exposed to incident radiation;
a metal layer adjacent to and covering the top surface of the scintillator layer;
a compressible layer adjacent a top surface of the metal layer; and
a housing that compresses the compressible layer against the metal layer to mechanically compress the metal layer against the scintillator layer to form an optically reflective surface directly against the top surface of the scintillator layer to reflect emitted photons back through the scintillator layer towards the photodetector array and seal the scintillator layer between the metal layer and the scintillator substrate.

2. The radiation imaging device of claim 1, further comprising an adhesive surrounding a perimeter of the scintillator substrate to attach the metal layer to the scintillator substrate.

3. The radiation imaging device of claim 2, wherein the adhesive attaches to a bottom surface of the metal layer and a top surface of the scintillator substrate.

4. The radiation imaging device of claim 2, wherein the adhesive attaches to an outside edge of a top surface of the metal layer and a top surface of the scintillator substrate.

5. The radiation imaging device of claim 2, wherein the adhesive comprises moisture getter particles.

6. The radiation imaging device of claim 1, wherein the metal layer is flexible to conform to the top surface of the scintillator layer.

7. The radiation imaging device of claim 6, wherein the metal layer has a thickness selected to be impervious to moisture.

8. The radiation imaging device of claim 7, wherein the metal layer is aluminum.

9. The radiation imaging device of claim 8, wherein the metal layer has a thickness between 25 µm and 100 µm.

10. The radiation imaging device of claim 1, wherein the compressible layer is comprised of any one of a foam, a gel, an air bag, and a soft silicone rubber.

11. The radiation imaging device of claim 1, wherein the scintillator substrate is any one of the photodetector array, and a fiber optic plate.

12. The radiation imaging device of claim 1, wherein the top surface of the scintillator layer has a Parylene coating.

13. The radiation imaging device of claim 1, wherein the metal layer has an optically reflective bottom surface that reflects photons generated by the scintillator layer toward the photodetector array.

14. The radiation imaging device of claim 1, wherein the metal layer comprises a single metal layer of radiolucent metal.

15. The radiation imaging device of claim 14, wherein the radiolucent metal is aluminum.

16. The radiation imaging device of claim 1, wherein mechanical compression of the metal layer against the scintillator layer forms a moisture seal across the top and bottom surfaces of the scintillator layer between the metal layer and scintillator substrate.

17. A radiation imaging device comprising:
a photodetector array disposed on an imager substrate;
a scintillator layer deposited on a scintillator substrate, the scintillator layer having a top surface and a bottom surface, the bottom surface optically coupled to the photodetector array to provide emitted photons to the photodetector array when the top surface is exposed to incident radiation;
a metal layer resting on and covering the top surface of the scintillator layer such that the adjacent surfaces of the metal layer and the scintillator layer are not directly attached, said metal layer comprised of a radiolucent metal to allow incident radiation to pass through to the scintillator layer, said metal layer having a thickness selected to be impervious to moisture;
an adhesive surrounding a perimeter of the scintillator substrate to attach the metal layer to the scintillator substrate;
a compressible layer that mechanically compresses the metal layer against the scintillator layer such that the metal layer forms an optically reflective surface directly against the top surface of the scintillator layer to reflect emitted photons back through the scintillator layer towards the photodetector array and forms a moisture seal between the top surface of the scintillator layer and the metal layer and between the bottom surface of the scintillator layer and the scintillator substrate; and a housing that compresses the compressible layer against the metal layer.

18. A radiation imaging device comprising:

a photodetector array disposed on an imager substrate;

a scintillator layer deposited on a scintillator substrate, the scintillator layer having a top surface and a bottom surface, the bottom surface optically coupled to the photodetector array to provide emitted photons to the photodetector array when the top surface is exposed to incident radiation;

a metal layer adjacent to and covering the top surface of the scintillator layer;

a compressible layer adjacent a top surface of the single aluminum layer; and a housing that compresses the compressible layer against the metal layer to seal the scintillator layer between the metal layer and the scintillator substrate.

19. The radiation imaging device of claim 18, wherein the metal layer comprises a single aluminum layer.

20. The radiation imaging device of claim 19, wherein compression of the metal layer against the scintillator layer forms a moisture seal across the top and bottom surfaces of the scintillator layer between the metal layer and scintillator substrate.

* * * * *